(12) United States Patent
Larsson et al.

(10) Patent No.: US 11,892,824 B2
(45) Date of Patent: Feb. 6, 2024

(54) METHOD OF DETECTING SENSOR MALFUNCTION, CONTROL SYSTEM, AUTOMATED GUIDED VEHICLE AND MOBILE ROBOT

(71) Applicant: ABB Schweiz AG, Baden (CH)

(72) Inventors: Jonas Larsson, Västerås (SE); Aftab Ahmad, Västerås (SE); Pietro Falco, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/251,023

(22) PCT Filed: Nov. 5, 2020

(86) PCT No.: PCT/EP2020/081057
§ 371 (c)(1),
(2) Date: Apr. 28, 2023

(87) PCT Pub. No.: WO2022/096096
PCT Pub. Date: May 12, 2022

(65) Prior Publication Data
US 2023/0305546 A1    Sep. 28, 2023

(51) Int. Cl.
*G05B 19/418*    (2006.01)
*G05D 1/02*    (2020.01)

(52) U.S. Cl.
CPC ..... *G05B 19/41895* (2013.01); *G05D 1/0214* (2013.01); *G05D 1/0223* (2013.01); *G05D 2201/0216* (2013.01)

(58) Field of Classification Search
CPC ........... G05B 19/41895; G05D 1/0214; G05D 1/0223; G05D 2201/0216
See application file for complete search history.

(56) References Cited

U.S. PATENT DOCUMENTS

| 4,105,900 A | 8/1978 | Martin et al. |
| 2008/0154429 A1 | 6/2008 | Lee et al. |
| 2016/0103450 A1 | 4/2016 | Hogenmueller et al. |

(Continued)

FOREIGN PATENT DOCUMENTS

| CN | 208807862 U | 5/2019 | |
| CN | 111712419 A | * 9/2020 | ............ B60W 30/16 |

(Continued)

OTHER PUBLICATIONS

English translation of CN 111712419 (Year: 2020).*

(Continued)

*Primary Examiner* — Shon G Foley
(74) *Attorney, Agent, or Firm* — Whitmyer IP Group LLC

(57) ABSTRACT

A method of detecting sensor malfunction in an automated guided vehicle, AGV, including for at least two different pairs of wheel units in a motion state of the AGV, calculating a motion value for at least one motion variable of a body of the AGV based on sensor data from a wheel sensors and/or a steering sensors; for at least one motion variable, calculating a difference between the motion values for at least two different pairs; and determining that there is a malfunction in one or more of the wheel sensors and the steering sensors if one of the at least one difference exceeds a threshold value associated with the respective motion variable.

20 Claims, 13 Drawing Sheets

(56) References Cited

U.S. PATENT DOCUMENTS

2016/0375732 A1    12/2016  Lazar, et al.
2019/0286134 A1     9/2019  Niesen et al.

FOREIGN PATENT DOCUMENTS

| EP | 738639 A2 | 10/1996 | |
| EP | 738639 A3 | 4/1998 | |
| KR | 20140040939 A * | 4/2020 | ............ G01P 21/025 |
| WO | 2020183727 A1 | 9/2020 | |

OTHER PUBLICATIONS

English translation of KR 20140040939 (Year: 2014).*
PCT International Search Report and Written Opinion of the International Searching Authority; Application No. PCT/EP2020/081057; Completed: May 8, 2023; 7 Pages.
Hashimoto, Masafumi, et al.; "Sensor fault detection and isolation for mobile robots in a multi-robot team"; 2009 35th Annual Conference of IEEE Industrial Electronics, IEEE; Porto, Portugal; Nov. 3, 2009; 6 Pages.
Byun, Yeun-Sub, et al.; "Sensor Fault Detection and Signal Restoration in Intelligent Vehicles"; MDPI, Sensors, vol. 19, No. 15; Jul. 27, 2019; 20 Pages.
International Search Report and Written Opinion of the International Searching Authority; Application No. PCT/EP2020/081057; Completed: May 31, 2021; dated Jun. 28, 2021; 15 Pages.
US Certificate of Correction; U.S. Appl. No. 4/105,900, filed Aug. 8, 1978; Issued: Mar. 6, 1979; 2 Pages.

* cited by examiner

METHOD OF DETECTING SENSOR MALFUNCTION, CONTROL SYSTEM, AUTOMATED GUIDED VEHICLE AND MOBILE ROBOT

TECHNICAL FIELD

The present disclosure generally relates to detection of sensor malfunction. In particular, a method of detecting sensor malfunction in an automated guided vehicle, AGV, a control system for detecting sensor malfunction in an AGV, an AGV comprising a control system, and a mobile robot comprising an industrial robot and an AGV, are provided.

BACKGROUND

Some automated guided vehicles, AGVs, such as autonomous mobile robots, comprise three or more-wheel units each comprising a traction wheel independently drivable about a wheel axis and independently steerable about a steering axis, perpendicular to the associated wheel axis. AGVs with three such independently controllable traction wheels need high precision position information from each traction wheel in order to guarantee a precise motion without generating internal forces and slippage. To this end, the AGV may for each traction wheel comprise a wheel sensor for determining a rotational parameter of the traction wheel with respect to the wheel axis and a steering sensor for determining a rotational parameter of the traction wheel with respect to the steering axis. Safety is also a fundamental design requirement for AGVs. In order to provide this safety, it is central to have a trustworthy estimation of the AGV's movements and that the AGV is capable of detecting various internal faults, such as sensor malfunction.

In order to detect sensor malfunction, the wheel sensors and the steering sensors may be safety-rated. Such safety-rated sensors can automatically communicate a malfunction. A further solution to detect sensor malfunction is to introduce sensor redundancy. In the above example, each wheel unit may then comprise two-wheel sensors and two steering sensors. When readings from two sensors of the same type and in the same wheel unit are different, it can be concluded that one of the sensors malfunctions. Common for these two solutions is that they are complicated and expensive.

SUMMARY

One object of the present disclosure is to provide a cost-effective method of detecting sensor malfunction in an automated guided vehicle, AGV.

A further object of the present disclosure is to provide a simple method of detecting sensor malfunction in an AGV.

A still further object of the present disclosure is to provide a reliable method of detecting sensor malfunction in an AGV.

A still further object of the present disclosure is to provide a method of detecting sensor malfunction in an AGV, which method can rapidly detect sensor malfunction.

A still further object of the present disclosure is to provide a method of detecting sensor malfunction in an AGV, which method can accurately detect sensor malfunction.

A still further object of the present disclosure is to provide a method of detecting sensor malfunction in an AGV, which method solves several or all of the foregoing objects in combination.

A still further object of the present disclosure is to provide a control system for detecting sensor malfunction in an AGV, which control system solves one, several or all of the foregoing objects.

A still further object of the present disclosure is to provide an AGV solving one, several or all of the foregoing objects.

A still further object of the present disclosure is to provide a mobile robot solving one, several or all of the foregoing objects.

According to one aspect, there is provided a method of detecting sensor malfunction in an automated guided vehicle, AGV, the AGV comprising a body and at least three independently controllable wheel units connected to the body, wherein each wheel unit comprises a traction wheel rotatable about a wheel axis and about a steering axis perpendicular to the wheel axis; a wheel sensor arranged to determine a rotational parameter of the traction wheel with respect to the wheel axis as sensor data; and a steering sensor arranged to determine a rotational parameter of the traction wheel with respect to the steering axis as sensor data; wherein the method comprises for at least two different pairs of wheel units in a motion state of the AGV, calculating a motion value for at least one motion variable of the body based on the sensor data from the wheel sensors and/or the steering sensors; for at least one motion variable, calculating a difference between the motion values for at least two different pairs; and determining that there is a malfunction in one or more of the wheel sensors and the steering sensors if one of the at least one difference exceeds a threshold value associated with the respective motion variable.

Since the AGV comprises at least three-wheel units, the AGV comprises at least three independent wheel axis variables (i.e., motion around a respective wheel axis) and at least three independent steering axis variables (i.e., motion around a respective steering axis). When the wheel sensors and the steering sensors of one pair of wheel units function correctly, the velocity and the yaw rate of the body during motion of the AGV can be determined unambiguously based on sensor data from this pair of wheel units. Since the AGV comprises at least three-wheel units, a redundant determination of the velocity and yaw rate is possible. The method utilizes this redundant nature between different pairs of wheel units to detect sensor malfunction. The 3σ method thereby enables strong and cost-effective self-diagnostics on the AGV.

By calculating motion values for at least one motion variable based on sensor data from the wheel units, the method uses forward kinematics to detect sensor malfunction. Since a motion value is calculated for each of at least two different pairs of wheel units, at least two motion values are calculated independently.

For two different pairs of wheel units, one difference between motion values may be calculated for at least one motion variable. In this case, the method may comprise calculating a first motion value for at least one motion variable of the body based on the sensor data from the wheel sensors and the steering sensors of a first pair of wheel units in a motion state of the AGV, calculating a second motion value for at least one motion variable of the body based on the sensor data from the wheel sensors and the steering sensors of a second pair of wheel units, different from the first pair, in the motion state of the AGV, and for at least one motion variable, calculating a difference between the first motion value and the second motion value. For three different pairs of wheel units, three differences between motion values may be calculated for each motion variable. For six different pairs of wheel units, differences between motion values may be calculated for each motion variable etc.

The method enables sensor malfunction in any of the wheel sensors and the steering sensors of the AGV to be detected in real time in a simple manner. By repeatedly calculating motion values and differences between motion values during movement of the AGV, the functionality of wheel sensors and the steering sensors is monitored, and sensor malfunction can be detected almost immediately. The threshold value may be determined for at least one motion variable by performing a number of different motions of the AGV and monitoring the fluctuations of the motion variables when the wheel sensors and the steering sensors function properly. The threshold value for at least one motion variable may then be set higher than these normal fluctuations.

The AGV is arranged to travel in two dimensions, e.g. on a horizontal floor. This means that the motion of the AGV can always be unambiguously defined by its velocity and yaw rate. Velocity is a vector quantity that is direction-aware, in contrast to speed. Velocity and yaw rate are thus two examples of motion variables of the AGV.

The at least two different pairs may be selected arbitrarily. A first pair is different from a second pair if the first pair contains one wheel unit that is not contained in the second pair. Thus, two different pairs may contain a common wheel unit. A first pair and a second pair may be said to be unique if the first pair and the second pair do not contain any wheel unit in common. Thus, two different pairs may be constituted by two unique pairs of wheel units.

Rotational parameters of the traction wheel with respect to the wheel axis may comprise rotational position, rotational speed and/or rotational acceleration of the traction wheel about the wheel axis. Rotational parameters of the traction wheel with respect to the steering axis may comprise rotational position, rotational speed and/or rotational acceleration of the traction wheel about the steering axis.

The wheel axis may be horizontal, and the steering axis may be vertical when the AGV travels on a horizontal surface. In this case, the velocity of the body is defined in a horizontal plane and the yaw rate is a rotational speed of the body about a vertical axis. As used herein, a motion state is a state of the AGV when the body moves, in contrast to standstill.

Each wheel unit may comprise a steering motor for rotationally driving the traction wheel about the steering axis. One, several or each of the wheel units may comprise a wheel motor for rotationally driving the traction wheel about the wheel axis.

The method may further comprise determining that there is a malfunction in one or more of the wheel sensors and the steering sensors if one of the at least one difference exceeds a threshold value associated with the respective motion variable for a predetermined time period. The predetermined time period may be larger than 0.05 s and/or smaller than 1 s, such as 0.05 s to 1 s.

The at least one motion variable may comprise a velocity of the body, a yaw rate of the body and/or an instant center of rotation, ICR, of the traction wheels. According to one variant, the at least one motion variable comprises a yaw rate of the body, and at least one of a velocity of the body and an instant center of rotation of the traction wheels.

The sensor data may comprise a rotational speed of the traction wheel about the wheel axis, a rotational position of the traction wheel about the steering axis, and/or a rotational speed of the traction wheel about the steering axis.

The method may further comprise executing a countermeasure upon determining that there is a malfunction in one or more of the wheel sensors and the steering sensors. The countermeasure may comprise stopping the AGV. Examples of alternative countermeasures may comprise issuance of an audible alarm or a visual alarm.

The method may further comprise for one or more of the at least one motion variable, determining the threshold value associated with the respective motion variable in dependence of the motion state. In general, the threshold value may be set relatively high when the body travels along a trajectory involving relatively fast steering movements. In this case, there is an increased likelihood that the traction wheels are not perfectly aligned at each time instant. Conversely, the threshold value may be set relatively low when the body travels along a trajectory involving relatively slow steering movements.

Alternatively, or in addition, the threshold value may be set relatively high for relatively high speeds of the body, and relatively low for relatively low speeds of the body. Alternatively, or in addition, the threshold value may be set relatively high for relatively high yaw rates of the body, and relatively low for relatively low yaw rates of the body.

The threshold value may be determined in dependence of a resolution of one or more of the wheel sensors and the steering sensors. The threshold value may be set relatively high for relatively low resolutions of the wheel sensors and the steering sensors, and relatively low for relatively high resolutions of the wheel sensors and the steering sensors.

The method may further comprise neglecting the malfunction if an instant center of rotation of the traction wheels is within a threshold distance from any of the steering axes. The threshold distance may for example be set to 50% of a minimum distance between steering axes of two traction wheels or less, such as 20% of a minimum distance between steering axes of two traction wheels or less.

The calculation of the motion value may be made for each different pair of wheel units in the motion state of the AGV. Thus, all possible combinations of pairs of wheel units may be used for the sensor malfunction determination. In this way, a confidence level of a sensor malfunction determination can be increased. In case the AGV comprises exactly three-wheel units, there are three unique pairs. In case the AGV comprises exactly four-wheel units, there are six unique pairs etc.

According to a further aspect, there is provided a control system for detecting sensor malfunction in an automated guided vehicle, AGV, where the AGV comprises a body and at least three independently controllable wheel units connected to the body, and where each wheel unit comprises a traction wheel rotatable about a wheel axis and about a steering axis perpendicular to the wheel axis; a wheel sensor arranged to determine a rotational parameter of the traction wheel with respect to the wheel axis as sensor data; and a steering sensor arranged to determine a rotational parameter of the traction wheel with respect to the steering axis as sensor data; wherein the control system comprises at least one data processing device and at least one memory having a computer program stored thereon, the at least one computer program comprising program code which, when executed by the at least one data processing device, causes the at least one data processing device to perform, and/or command performance of, the method steps according to the present disclosure.

The at least one computer program comprises program code which, when executed by the at least one data processing device, causes the at least one data processing device to, for at least two different pairs of wheel units in a motion state of the AGV, calculate a motion value for at least one motion variable of the body based on the sensor data from the wheel sensors and/or the steering sensors; for at least one motion variable, calculate a difference between the motion values for at least two different pairs; and determine that there is a malfunction in one or more of the wheel sensors and the steering sensors if one of the at least one difference exceeds a threshold value associated with the respective motion variable.

The at least one computer program may comprise program code which, when executed by the at least one data processing device, causes the at least one data processing device to determine that there is a malfunction in one or more of the wheel sensors and the steering sensors if one of the at least one difference exceeds a threshold value associated with the respective motion variable for a predetermined time period.

The at least one motion variable may comprise a velocity of the body, a yaw rate of the body and/or an instant center of rotation of the traction wheels. According to one variant, the at least one motion variable comprises a yaw rate of the body, and at least one of a velocity of the body and an instant center of rotation of the traction wheels.

The sensor data may comprise a rotational speed of the traction wheel about the wheel axis, a rotational position of the traction wheel about the steering axis, and/or a rotational speed of the traction wheel about the steering axis.

The at least one computer program may comprise program code which, when executed by the at least one data processing device, causes the at least one data processing device to execute a countermeasure upon determining that there is a malfunction in one or more of the wheel sensors and the steering sensors. The countermeasure may comprise stopping the AGV.

The at least one computer program may comprise program code which, when executed by the at least one data processing device, causes the at least one data processing device to, for one or more of the at least one motion variable, determine the threshold value associated with the motion variable in dependence of the motion state.

The at least one computer program may comprise program code which, when executed by the at least one data processing device, causes the at least one data processing device to determine the threshold value in dependence of a resolution of one or more of the wheel sensors and the steering sensors.

The at least one computer program may comprise program code which, when executed by the at least one data processing device, causes the at least one data processing device to neglect the malfunction if an instant center of rotation of the traction wheels is within a threshold distance from any of the steering axes.

The at least one computer program may comprise program code which, when executed by the at least one data processing device, causes the at least one data processing device to calculate the motion value for each different pair of wheel units in the motion state of the AGV.

According to a further aspect, there is provided an automated guided vehicle, AGV, the AGV comprising a control system according to the present disclosure, a body and at least three independently controllable wheel units connected to the body, wherein each wheel unit comprises a traction wheel rotatable about a wheel axis and about a steering axis perpendicular to the wheel axis; a wheel sensor arranged to determine a rotational parameter of the traction wheel with respect to the wheel axis as sensor data; and a steering sensor arranged to determine a rotational parameter of the traction wheel with respect to the steering axis as sensor data. The AGV may be of any type according to the present disclosure. Each wheel unit may comprise a steering motor for rotationally driving the traction wheel about the steering axis. One, several or each of the wheel units may comprise a wheel motor for rotationally driving the traction wheel about the wheel axis.

According to a further aspect, there is provided a mobile robot comprising an industrial robot carried by an AGV according to the present disclosure.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
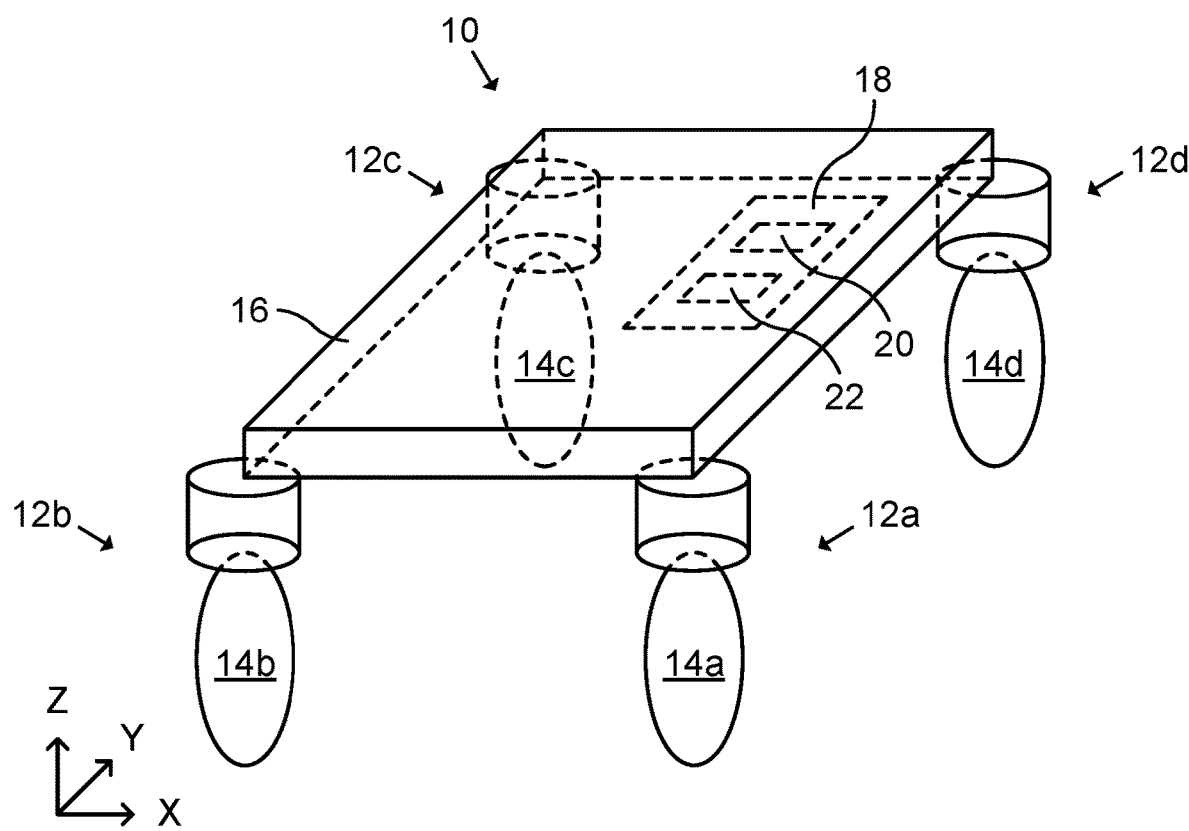
FIG. 1: schematically represents a perspective view of an AGV comprising a plurality of wheel units.

In the following, a method of detecting sensor malfunction in an automated guided vehicle, AGV, a control system for detecting sensor malfunction in an AGV, and an AGV comprising a control system, and a mobile robot comprising an industrial robot and an AGV, will be described. The same or 3o similar reference numerals will be used to denote the same or similar structural features.

FIG. 1 schematically represents a perspective view of one example of an automated guided vehicle, AGV, 10. The AGV 10 of this example comprises four-wheel units 12a, 12b, 12c and 12d. The first wheel unit 12a comprises a first traction wheel 14a, the second wheel unit 12b comprises a second traction wheel 14b, the third wheel unit 12c comprises a third traction wheel 14c, and the fourth wheel unit 12d comprises a fourth traction wheel 14d. One, several or all of the wheel units 12a, 12b, 12c and 12d may also be referred to with reference numeral "12". One, several or all of the traction wheels 14a, 14b, 14c and 14d may also be referred to with reference numeral "14". Although the AGV 10 in FIG. 1 comprises four-wheel units 12, the AGV 10 may alternatively comprise three-wheel units 12 or more than four-wheel units 12. The traction wheels 14 are configured to drive the AGV on a surface, such as a horizontal floor. FIG. 1 further shows a Cartesian coordinate system X, Y, Z for referencing purposes. The horizontal surface may lie in the XY-plane.

The AGV 10 further comprises a body 16, here exemplified as a platform. The body 16 is rigid. The body 16 provides a support surface on its upper side for carrying a load, such as an industrial robot (see FIG. 14).

The AGV 10 further comprises a control system 18. The control system 18 comprises a data processing device 20 and a memory 22 having a computer program stored thereon. The computer program comprises program code which, when executed by the data processing device 20, causes the data processing device 20 to perform, and/or command performance of, various steps as described herein.

In this example, the control system 18 is provided in the body 16. The control system 18 is in signal communication with each wheel unit 12, e.g. via controller area network (CAN) buses (not shown). The control system 18 may also comprise a battery (not shown) for powering each wheel unit 12.

Figure 2:
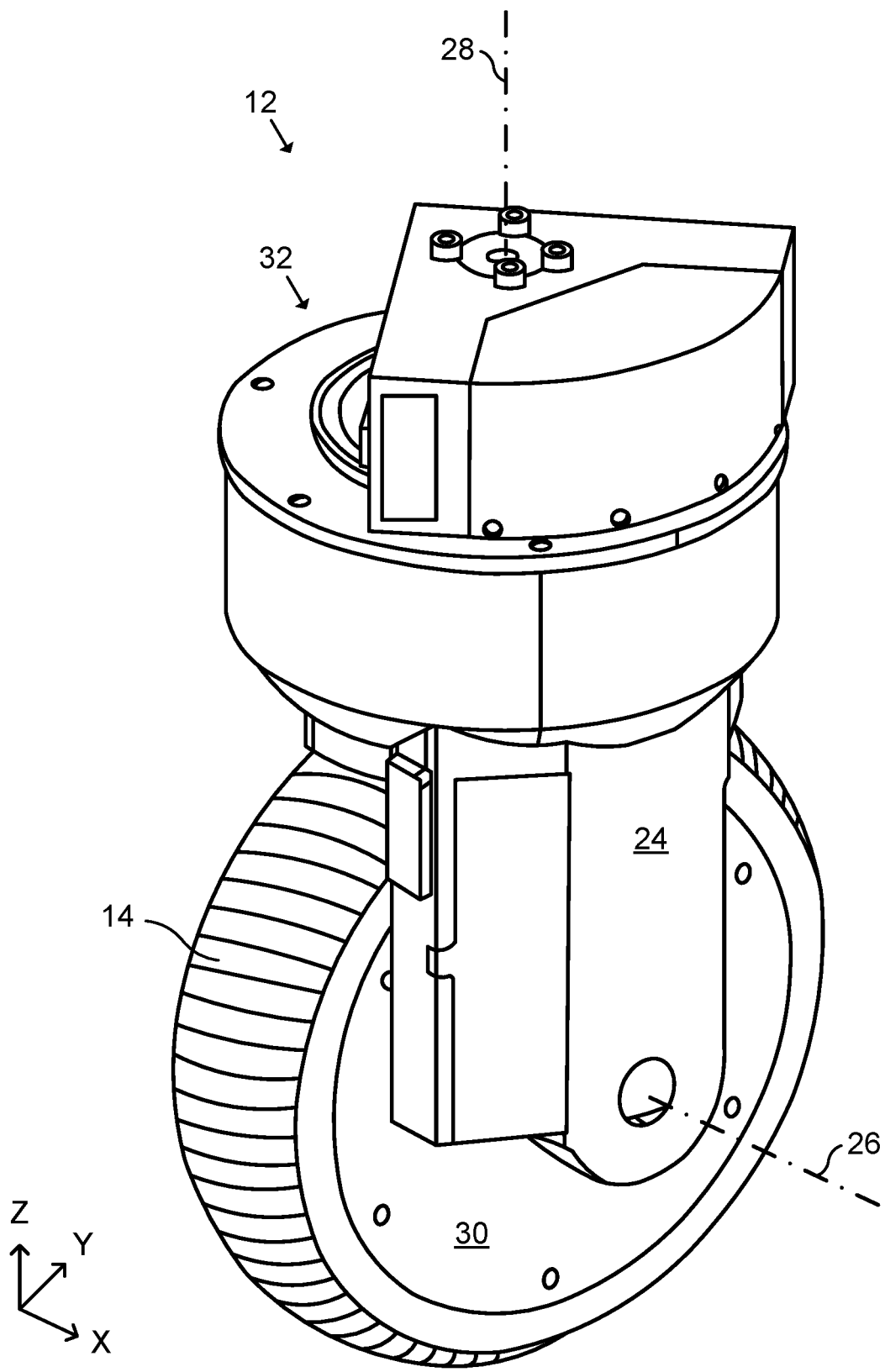
FIG. 2: schematically represents a perspective view of one of the wheel units in FIG. 1.

FIG. 2 schematically represents a perspective view of one of the wheel units 12 in FIG. 1. In this example, all wheel units 12 are of the same design. In addition to the traction wheel 14, the wheel unit 12 comprises a steering member 24. The traction wheel 14 is rotatable about a wheel axis 26. The steering member 24 is rotatable about a steering axis 28. The wheel axis 26 is perpendicular to the steering axis 28. Moreover, the wheel axis 26 intersects the steering axis 28. In FIG. 2, the wheel axis 26 is horizontal and the steering axis 28 is vertical. The wheel axis 26 and the steering axis 28 provide two degrees of freedom for the wheel unit 12.

The wheel unit 12 further comprises an electric synchronous wheel motor 30. The wheel motor 30 is arranged to rotationally drive the traction wheel 14 about the wheel axis 26.

The wheel unit 12 further comprises an electric synchronous steering motor 32. The steering motor 32 is arranged to rotationally drive the steering member 24, and consequently also the traction wheel 14, about the steering axis 28.

Figure 3:
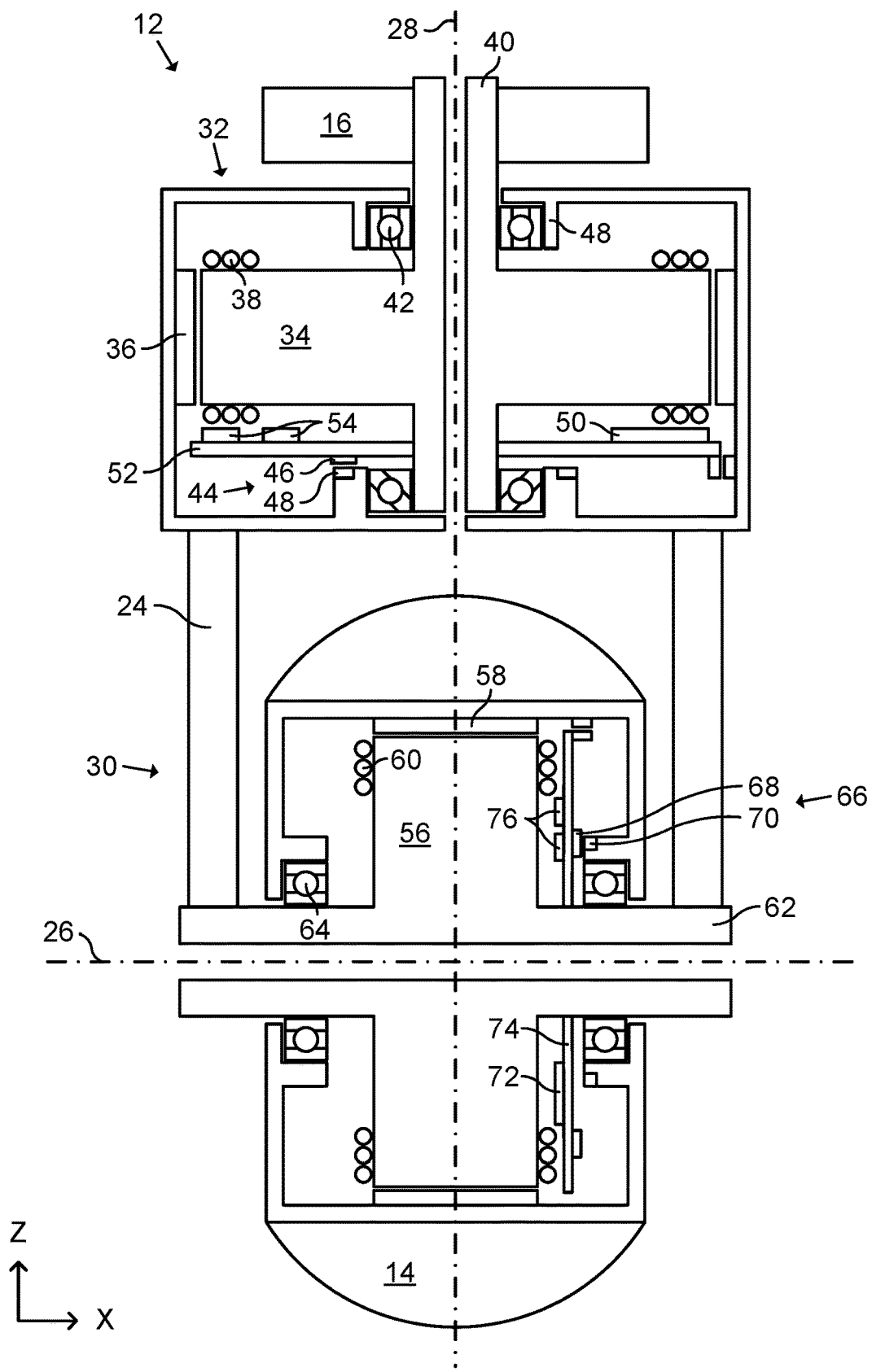
FIG. 3: schematically represents a cross-sectional side view of the wheel unit in FIG. 2.

FIG. 3 schematically represents a cross-sectional side view of the wheel unit 12 in FIG. 2. The steering motor 32 comprises a steering stator 34 and a steering rotor 36. The steering motor 32 further comprises steering coils 38 arranged on the steering stator 34. The steering rotor 36 comprises a plurality of magnets.

The wheel unit 12 further comprises a steering shaft 40. The steering shaft is concentric with the steering axis 28. Signal cables and power cables from the control system 18 may be routed through the steering shaft 40 to the steering motor 32.

The wheel unit 12 further comprises steering bearings 42. The steering bearings 42 rotationally support the steering member 24 about the steering axis 28.

The wheel unit 12 further comprises a steering sensor 44. The steering sensor 44 determines a rotational position of the steering member 24 about the steering axis 28 as sensor data. The steering sensor 44 of this example comprises an active part, here constituted by a Hall effect sensor 46, and a passive part, here constituted by a multipole steering encoder ring 48. The steering encoder ring 48 may for example comprise 128 poles. The steering sensor 44 thereby constitutes a high-resolution encoder for accurate determination of a rotational position of the steering rotor 36, the steering member 24, and the traction wheel 14 about the steering axis 28.

The wheel unit 12 further comprises steering drive electronics 50. The steering drive electronics 50 controls the operation of the steering motor 32, for example by means of PWM control.

The wheel unit 12 further comprises a steering circuit board 52. The Hall effect sensor 46 and the steering drive electronics 50 are provided on the steering circuit board 52, for example by means of soldering. FIG. 3 further shows two transistors 54 provided on the steering drive electronics 50. The steering encoder ring 48 is connected to the steering member 24.

The wheel motor 30 comprises a wheel stator 56 and a wheel rotor 58. The wheel motor 30 further comprises wheel coils 60 arranged on the wheel stator 56. The wheel rotor 58 comprises a plurality of magnets.

The wheel unit 12 further comprises a wheel shaft 62. The wheel shaft 62 is concentric with the wheel axis 26. Signal cables and power cables from the control system 18 may be routed through the wheel shaft 62 to the wheel motor 30. The signal cables and power cables to the wheel motor 30 may optionally also be routed through the steering motor 32, such as through the steering shaft 40.

The wheel unit 12 further comprises wheel bearings 64. The wheel bearings 64 rotationally support the traction wheel 14 about the wheel axis 26.

The wheel unit 12 further comprises a wheel sensor 66. The wheel sensor 66 may be of the same type as the steering sensor 44. In addition to a rotational position of the traction wheel 14 about the wheel axis 26, the wheel sensor 66 can determine a rotational speed of the traction wheel 14 about the wheel axis 26 as sensor data. The wheel sensor 66 of this example comprises an active part, here constituted by a Hall effect sensor 68, and a passive part, here constituted by a multipole wheel encoder ring 70. The wheel encoder ring 70 may for example comprise 128 poles. The wheel sensor 66 thereby constitutes a high-resolution encoder for accurate determination of a rotational position of the wheel rotor 58 and the traction wheel 14 about the wheel axis 26. The steering sensor 44 and the wheel sensor 66 enable high-performance control of each wheel unit 12, and thereby also of the AGV 10.

The wheel unit 12 further comprises wheel drive electronics 72. The wheel drive electronics 72 controls the operation of the wheel motor 30, for example by means of PWM control.

The wheel unit 12 further comprises a wheel circuit board 74. The Hall effect sensor 68 and the wheel drive electronics 72 are provided on the wheel circuit board 74, for example by means of soldering. FIG. 3 further shows two transistors 76 provided on the wheel drive electronics 72.

Figure 4:
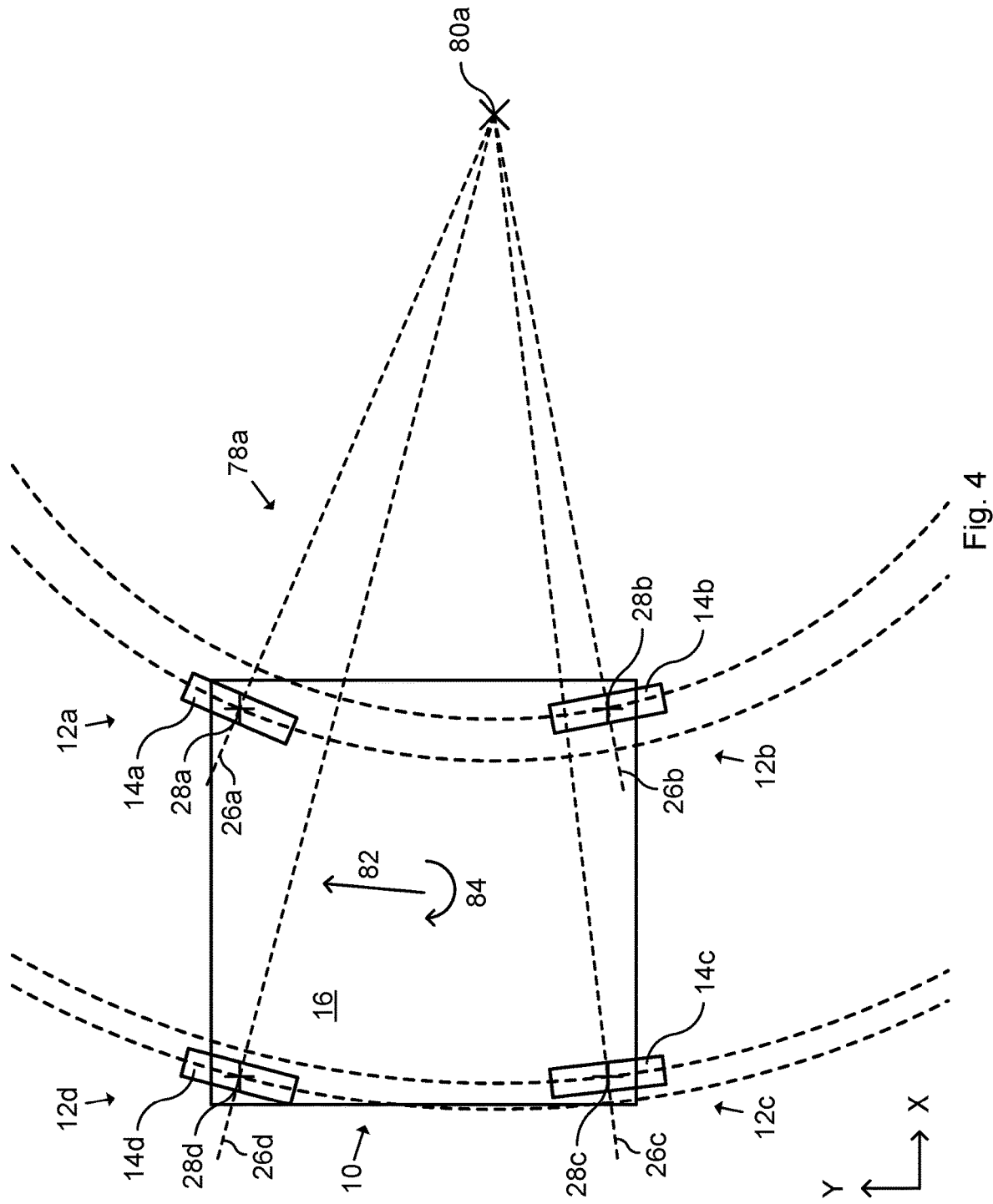
FIG. 4: schematically represents a top view of the AGV in a motion state where the AGV moves with respect to an ICR.

FIG. 4 schematically represents a top view of the AGV 10 in a motion state 78a where the AGV 10 moves with respect to an instant center of rotation, ICR, 80a. The wheel axes 26a, 26b, 26c and 26d of the traction wheels 14 intersect at the ICR 80a. Thus, the path of each traction wheel 14 is circular and centered on the ICR 80a. In the motion state 78a, the body 16 has a velocity 82 and a yaw rate 84 as shown in FIG. 4. Each of the ICR 80a, the velocity 82 and the yaw rate 84 constitutes examples of a motion variable of the body 16 according to the present disclosure. As shown in FIG. 4, the steering axes 28a, 28b, 28c and 28d of this example are positioned in corners of a square. One, several or all of the wheel axes 26a, 26b, 26c and 26d may also be referred to with reference numeral "26". One, several or all of the steering axes 28a, 28b, 28c and 28d may also be referred to with reference numeral "28".

Motion control of the AGV 10 may be performed by mapping desired motion variables of the body 16, such as the velocity 82 and the yaw rate 84 to corresponding rotational parameters of each wheel unit 12. This may for example be made using the ICR 80a or the Cartesian coordinate system X, Y, Z (at least the XY-plane thereof). The desired motion variables of the body 16 may be referred to as task space variables and the rotational parameters of each wheel unit 12 may be referred to as joint space variables. Since the AGV 10 comprises three or more-wheel units 12, each having a traction wheel 14 independently drivable about a respective wheel axis 26 and independently steerable about a respective steering axis 28, the AGV 10 is a redundant system in that a joint space dimension is larger than a task space dimension.

For the illustrated configuration of the AGV 10 in FIG. 4, there are eight joint space variables (the four-wheel axes 26 and the four steering axes 28) and three task space variables (the yaw rate 84 or the ICR 80a, and the velocity 82 expressed in two planar position coordinates X, Y).

When the wheel sensors 66 and the steering sensors 44 function correctly, sensor data from only two-wheel units 12 is sufficient to unambiguously compute the task space variables of the body 16, such as the velocity 82, the yaw rate 84 and the ICR 80a. Different pairs of wheel units 12 can therefore be used to compute these task space variables. When all wheel sensors 66 and all steering sensors 44 function correctly, task space variable estimates from all these pairs should be identical. If there is a difference between two calculated task space variables for two different pairs exceeding a threshold value, it can be concluded that one of the wheel sensors 66 and the steering sensors 44 malfunctions. A safety reaction of the AGV 10, such as a stop, can therefore be automatically triggered when the calculated difference 3o exceeds the threshold value. The method according to the present disclosure exploits the redundancy of the AGV 10 comprising three or more-wheel units 12 to identify a fault in the wheel sensors 66 or the steering sensors 44, which in turn can be used to command a stop of the AGV 10.

Figure 5:
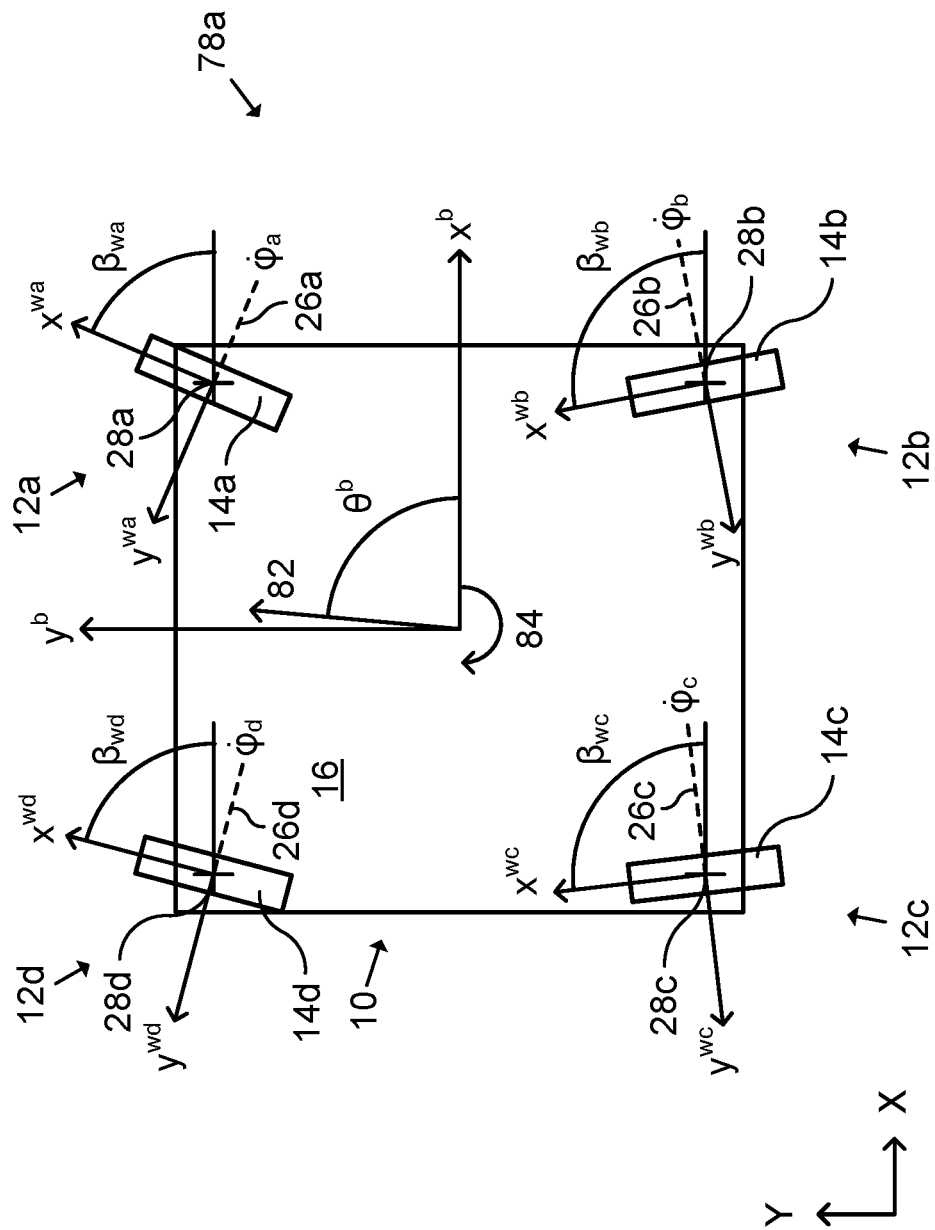
FIG. 5: schematically represents a further top view of the AGV in the motion state in FIG. 4.

FIG. 5 schematically represents a further top view of the AGV 10 in the motion state 78a in FIG. 4. With reference to FIG. 5, the forward kinematics Fu of the body 16 may be expressed as:

$$F_{ij} = \dot{\xi}_b = [\dot{x}^b \dot{y}^b \dot{\theta}^b] \tag{1}$$

where $\dot{x}^b$ is the component of the velocity 82 in direction $x^b$, $\dot{y}^b$ is the component of the velocity 82 in the direction $y^b$, and $\dot{\theta}^b$ is the yaw rate 84. For the wheel configuration in FIG. 5, the forward kinematics for each pair $F_{ab}$, $F_{ac}$, $F_{ad}$, $F_{bc}$, $F_{bd}$, and $F_{cd}$ of wheel units 12 can be calculated as follows:

$$\begin{bmatrix} \dot{x}^{w_{ij}} \\ \dot{y}^{w_{ij}} \end{bmatrix} = \begin{bmatrix} \cos\beta_{ij} & \sin\beta_{ij} & x_{i/j}\sin\beta_{ij} - y_{i/j}\cos\beta_{ij} \\ -\sin\beta_{ij} & \cos\beta_{ij} & x_{i/j}\cos\beta_{ij} + y_{i/j}\sin\beta_{ij} \end{bmatrix} \dot{\xi} \tag{2}$$

where $\dot{x}^{w_{ij}}$ is the tangential velocity of traction wheel i and j, $\dot{y}^{w_{ij}}$ is the normal velocity of traction wheel i and j, and $\beta_{i/j}$ is the steering angle of traction wheel i and j. The tangential velocity can be defined as:

$$\dot{x}^{w_{ij}} = R\dot{\phi}_{i/j} \tag{3}$$

where R is the radius of the traction wheel and $\dot{\phi}_{i/j}$ is the rotational speed about the wheel axis 26. The normal velocity of traction wheel i and j $\dot{y}^{w_{ij}}$ may be assumed to be zero (no slipping condition).

An error e for estimated forward kinematics Fu between different pairs of wheel units 12 are then calculated to identify a pair which gives largest error $e_{max}$ as follows:

$$e_1 = |F_{ab} - F_{ac}| \tag{4}$$

$$e_2 = |F_{ab} - F_{ad}| \tag{5}$$

$$e_3 = |F_{ab} - F_{bc}| \tag{6}$$

$$e_4 = |F_{ab} - F_{bd}| \tag{7}$$

$$e_5 = |F_{ab} - F_{cd}| \tag{8}$$

$$e_6 = |F_{ac} - F_{ad}| \tag{9}$$

$$e_7 = |F_{ac} - F_{bc}| \tag{10}$$

$$e_8 = |F_{ac} - F_{bd}| \tag{11}$$

$$e_9 = |F_{ac} - F_{cd}| \tag{12}$$

$$e_{10} = |F_{ad} - F_{bc}| \tag{13}$$

$$e_{11} = |F_{ad} - F_{bd}| \tag{14}$$

$$e_{12} = |F_{ad} - F_{cd}| \tag{15}$$

$$e_{13} = |F_{bc} - F_{bd}| \tag{16}$$

$$e_{14} = |F_{bc} - F_{cd}| \tag{17}$$

$$e_{15} = |F_{bd} - F_{cd}| \tag{18}$$

In case max $(e_k) > e_{max}$, where k is a natural number (1-15 in this example) and $e_{max}$ is the maximum allowed error, it can be concluded that one of the wheel sensor 66 and the steering sensor 44 is faulty. If this condition is observed for a predetermined time period, the control system 18 issues a command to stop the AGV 10. The predetermined time period may be larger than the reciprocal of a clock frequency of the data processing device 20, and smaller than a maximum time dependent on an amount of signal noise and tracking error (the difference between a commanded position and an actual position) of a motion control of the AGV 10. The predetermined time period may be less than 1 s, and may for example be set to 0.1 s or less.

Figure 6:
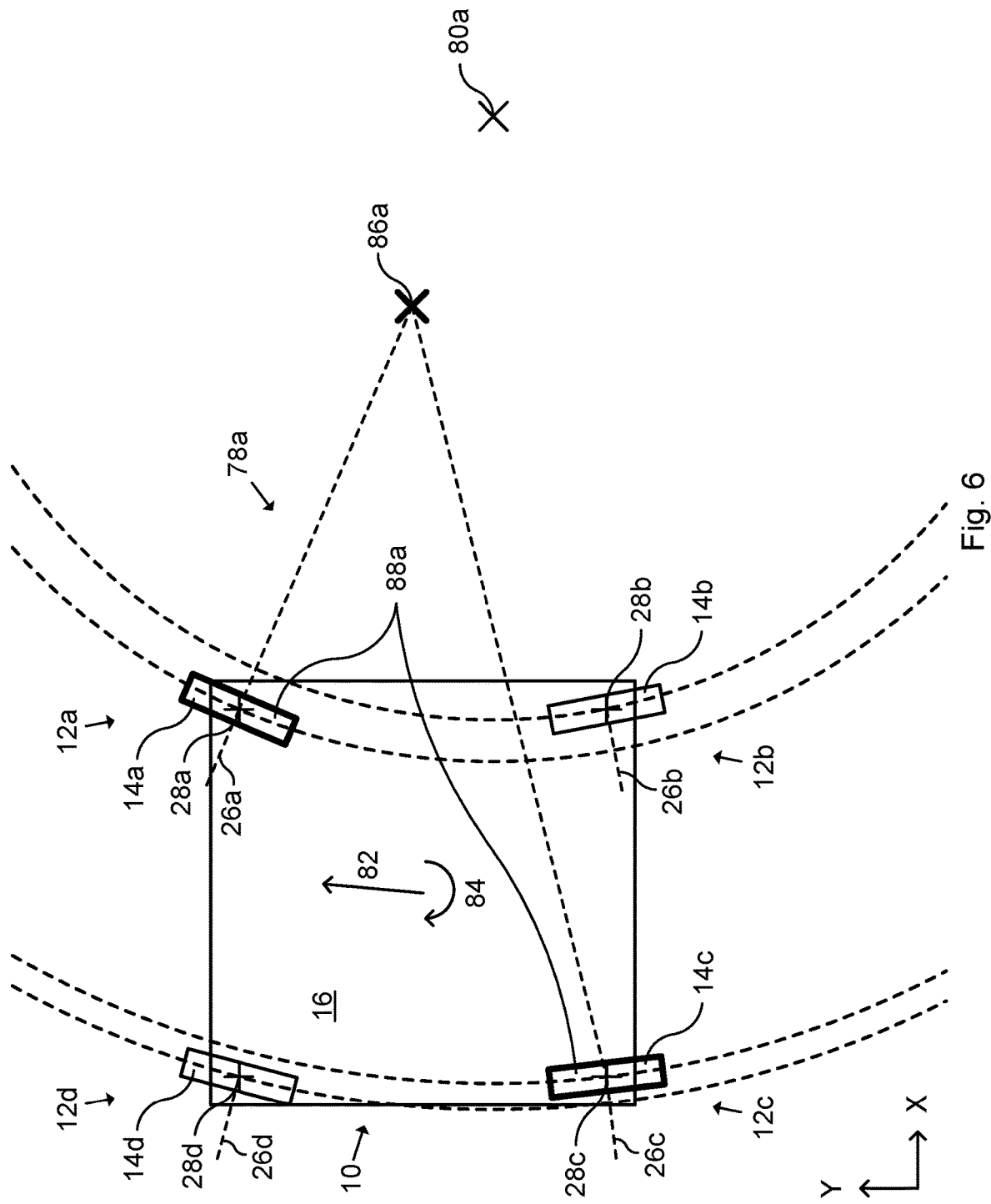
FIG. 6: schematically represents a calculation of a motion value of a motion variable based on sensor data from a first pair of wheel units in the motion state in FIG. 4.

FIG. 6 schematically represents a calculation of a first motion value 86a of a motion variable based on sensor data from a first pair 88a of wheel units 12a and 12c in the motion state 78a in FIG. 4. The motion variable of this example is a position of the ICR 80a. The first motion value 86a may be calculated by the data processing device 20. As shown in FIG. 6, the first motion value 86a does not correctly represent the ICR 80a since one or more of the wheel sensors 66 and the steering sensors 44 of the first wheel unit 12a and the third wheel unit 12c is faulty.

Figure 7:
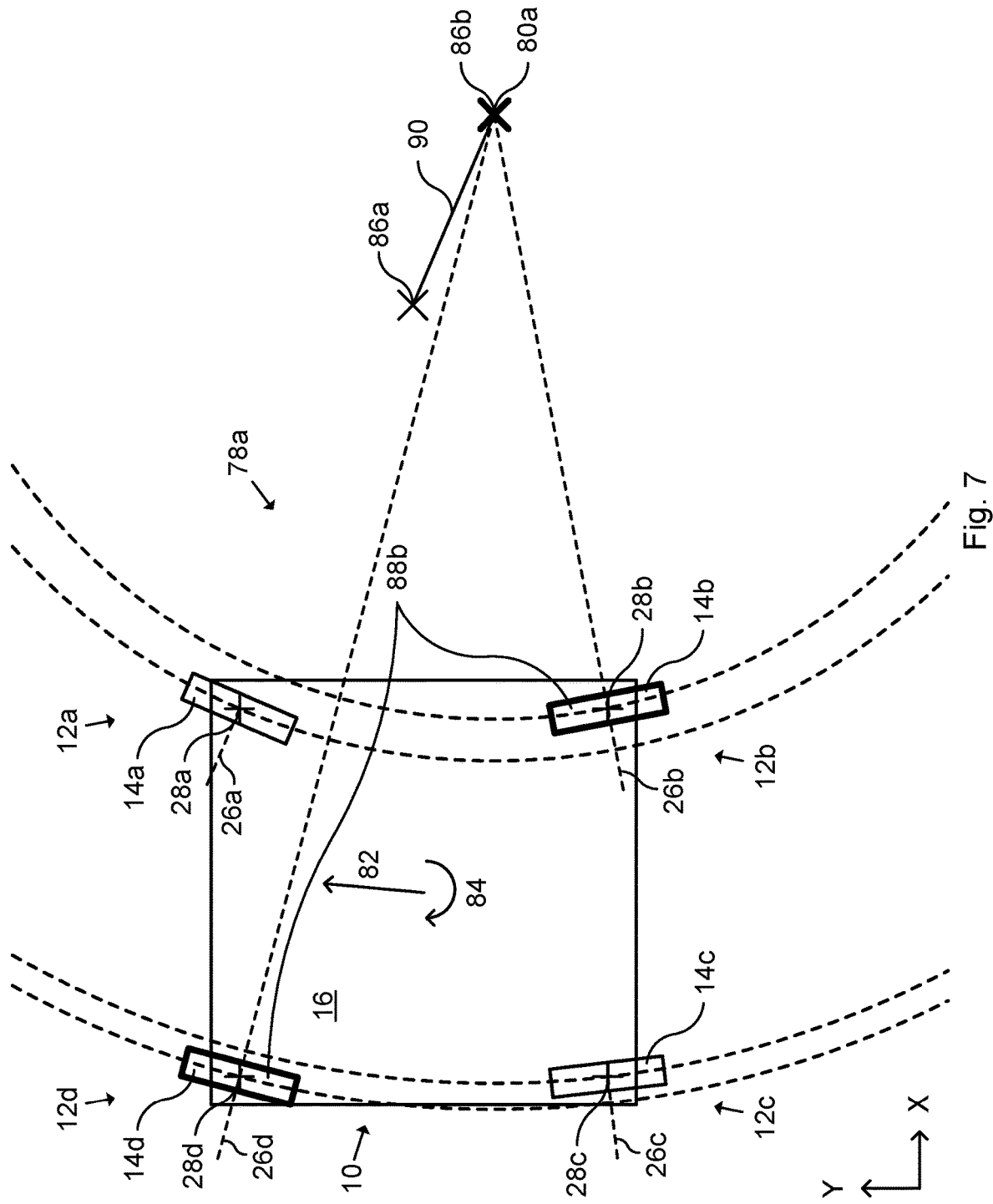
FIG. 7: schematically represents a calculation of a further motion value of the motion variable based on sensor data from a second pair of wheel units in the motion state in FIG. 4.

FIG. 7 schematically represents a calculation of a second motion value 86b of the ICR 80a based on sensor data from a second pair 88b of wheel units 12b and 12d in the motion state 78a in FIG. 4. The second motion value 86b is calculated independently of the first motion value 86a. As shown in FIG. 7, the first motion value 86a calculated based on the first pair 88a gives an erroneous position of the ICR 80a while the second motion value 86b calculated based on the second pair 88b gives a correct position of the ICR 80a.

It is however not necessary for the method to know whether a motion value 86a or 86b is correct. Instead, for the method it is relevant to see whether the motion values 86a and 86b differ from each other. A difference 90 between these motion values 86a and 86b is therefore calculated, e.g. by the data processing device 20. In this example, the difference 90 between the motion values 86a and 86b is determined as a length of a vector between the motion values 86a and 86b representing calculations of the ICR 80a. In case the difference 90 exceeds a threshold value, it is determined that one of the wheel sensors 66 and the steering sensors 44 malfunctions. In the example in FIG. 7, it is determined that one of the steering sensors 44 malfunctions since the motion values 86a and 86b representing the ICR 80a can be calculated solely based on sensor data from the steering sensors 44. Whether or not the difference 90 exceeds the threshold value may be determined by the data processing device 20.

In theory, no threshold values would be needed. However, during movement of the AGV 10, the traction wheels 14 will not be perfectly positioned and move perfectly at each time instant. By means of the threshold values, a true sensor malfunction can be distinguished from ordinarily fluctuating sensor readings. The AGV 10 can thereby detect sensor malfunction on the fly in a simple and cost-effective way.

Figure 8:
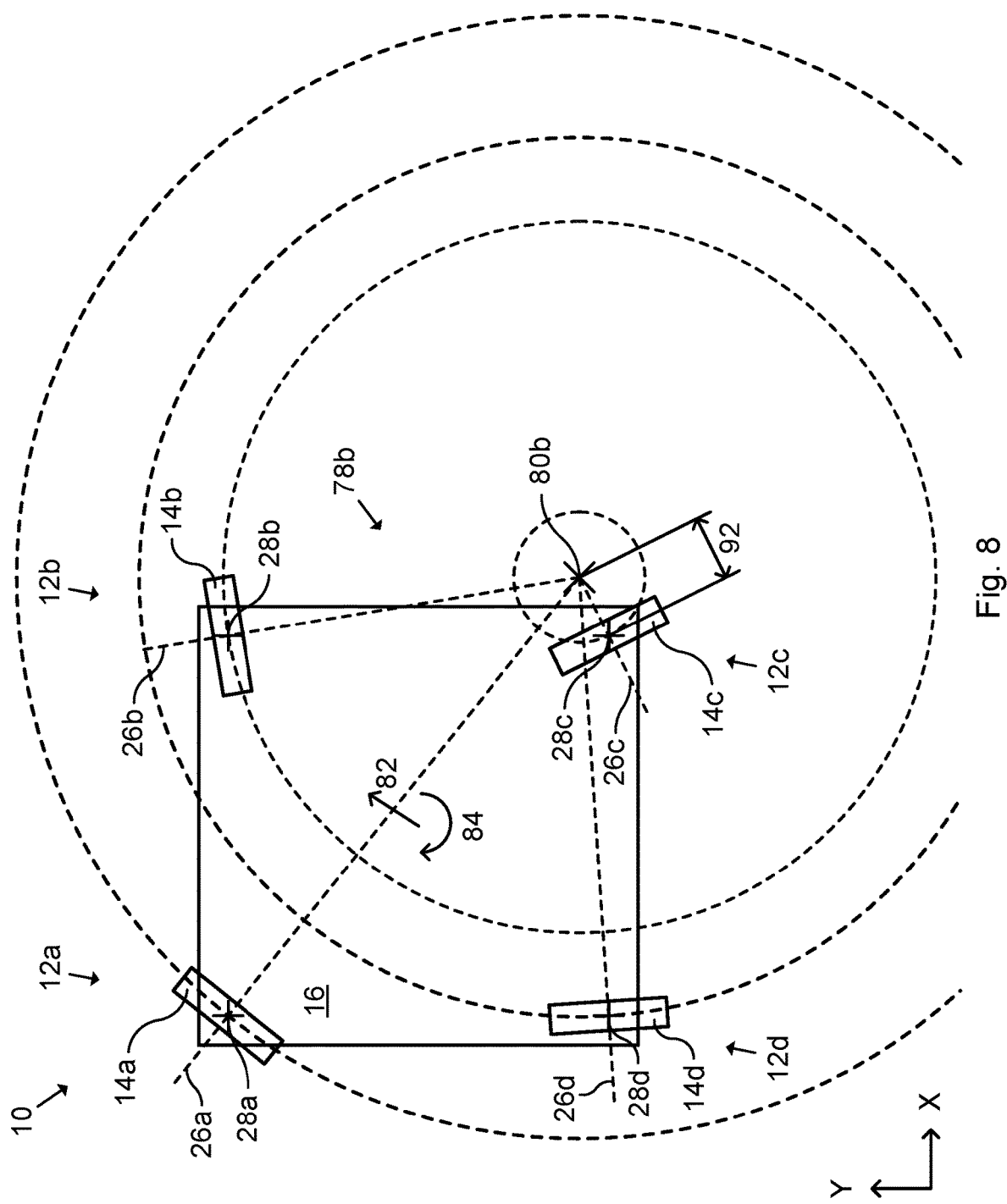
FIG. 8: schematically represents a top view of the AGV in a further motion state where the AGV moves with respect to a different ICR.

FIG. 8 schematically represents a top view of the AGV 10 in a further motion state 78b where the AGV 10 moves with respect to a different ICR 80b. In some motion states of the AGV 10, the mappings from the task space variables to the joint space variables are singular. One example of such motion state is when the body 16 rotates around one of the steering axes 28. In this motion state, the rotational position of the centered traction wheel 14 about the steering axis 28 is not relevant. Motions in the neighborhood of such singular points may however disturb the kinematic formulations of the AGV 10. One or more traction wheels 14 may therefore fail to follow motions of the AGV 10 that are compatible with a feasible ICR. This might cause errors in the estimation of the ICR which instantly leads to two problems: slippage of the traction wheels 14 by applying incorrect inverse kinematics, and fault in the feedback by an inaccurate forward kinematics solution and an inaccurate dead reckoning.

As shown in FIG. 8, the ICR 80b lies relatively close to the third steering axis 28c. In order to avoid that a singular motion state of the AGV 10 erroneously causes sensor malfunction determination, the method may neglect a malfunction determination if an ICR 80b is within a threshold distance 92 from any of the steering axes 28. In FIG. 8, the threshold distance 92 is approximately 15% of a minimum distance between steering axes 28 of adjacent traction wheels 14. By means of the threshold distance 92, the motion state 78b in the neighborhood of a singular mapping is special treated.

Figure 9:
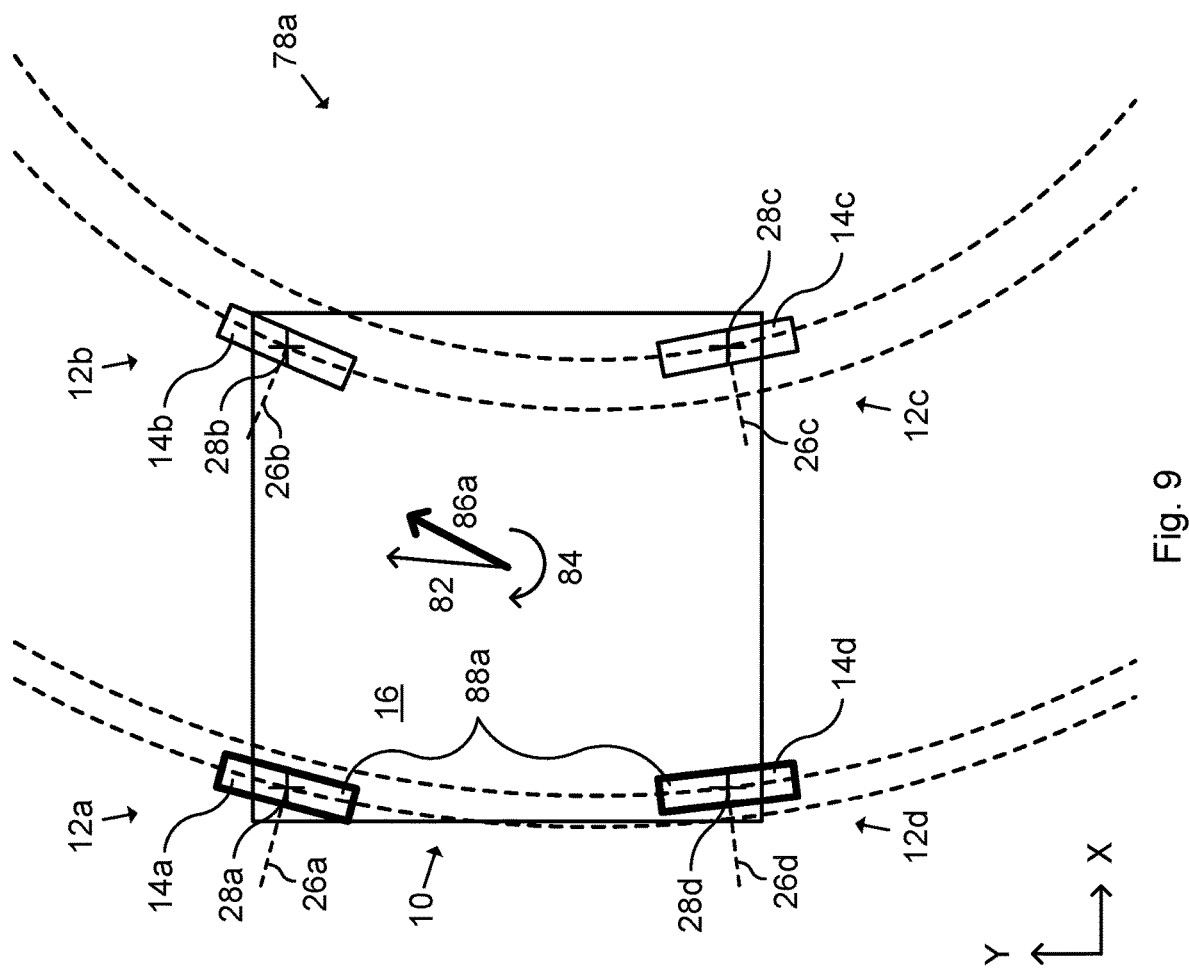
FIG. 9: schematically represents a further calculation of a first motion value of a further motion variable based on sensor data from a first pair of wheel units in the motion state in FIG. 4.

FIG. 9 schematically represents a further calculation of a first motion value 86a of a motion variable based on sensor data from a first pair 88a of wheel units 12a and 12d in the motion state 78a in FIG. 4. The motion variable of this example is the velocity 82 of the body 16. As shown in FIG. 9, the first motion value 86a does not correctly represent the velocity 82 since one or more of the wheel sensors 66 and the steering sensors 44 of the first wheel unit 12a and the fourth wheel unit 12d is faulty.

Figure 10:
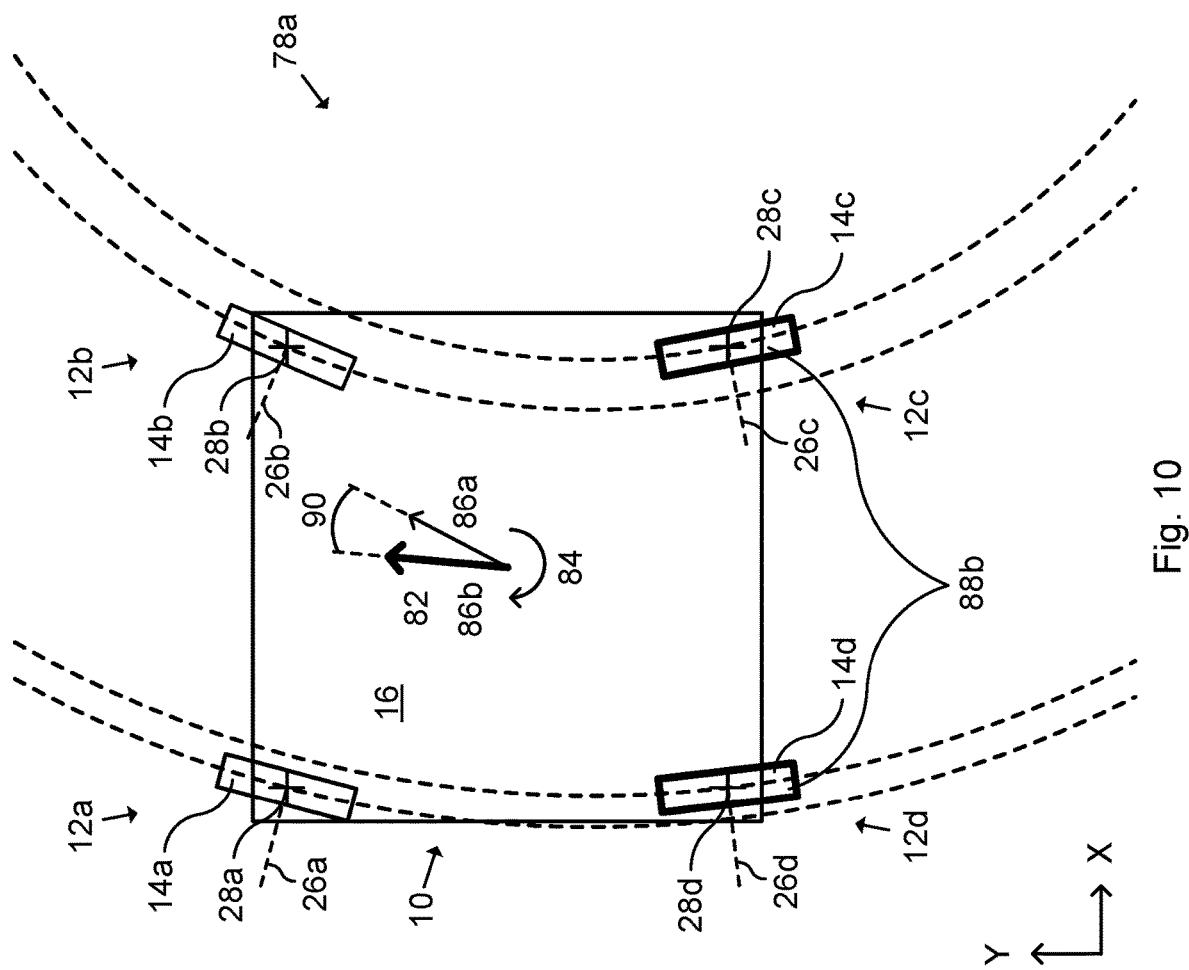
FIG. 10: schematically represents a further calculation of a second motion value of the motion variable in FIG. 9 based on sensor data from a second pair of wheel units in the motion state in FIG. 4.

FIG. 10 schematically represents a further calculation of a second motion value 86b of the velocity 82 based on sensor data from a second pair 88b of wheel units 12c and 12d in the motion state 78a in FIG. 4. As shown in FIG. 10, the first motion value 86a calculated based on the first pair 88a gives an erroneous velocity 82 while the second motion value 86b calculated based on the second pair 88b gives a correct velocity 82.

A difference 90 between these motion values 86a and 86b is then calculated. In this example, the difference 90 between the motion values 86a and 86b is determined as an angle between the vectors representing calculated velocities 82. The difference 90 between the motion values 86a and 86b representing the velocities 82 may alternatively be determined as a difference between the vectors or as a difference in length between the vectors (representing the speed difference). In any case, if the difference 90 exceeds a threshold value, it is determined that one of the wheel sensors 66 and the steering sensors 44 malfunctions.

Figure 11:
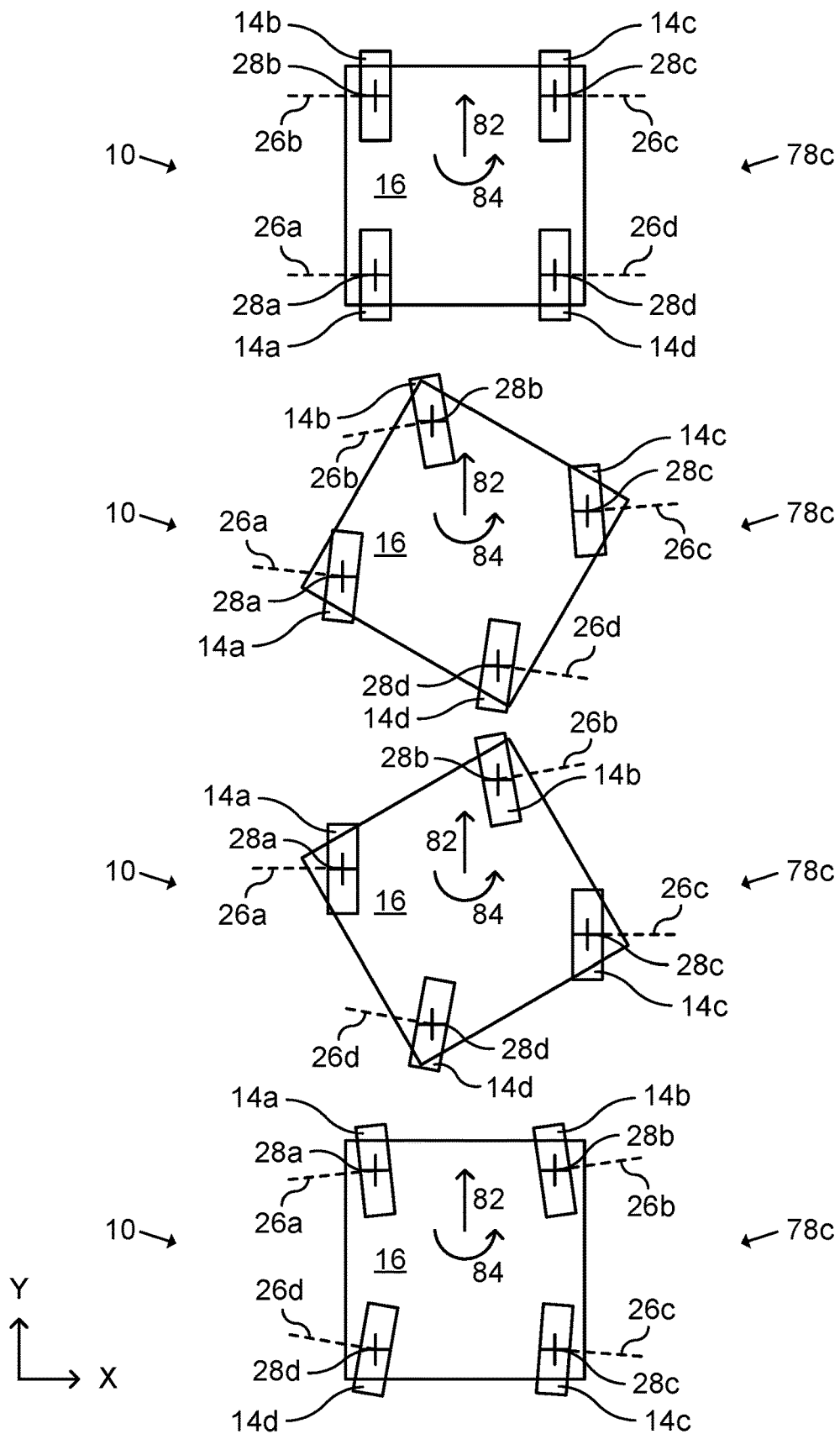
FIG. 11: schematically represents a plurality of top views of the AGV in a further motion state where the AGV moves by rotation along a straight path.

FIG. 11 schematically represents a plurality of top views of the AGV 10 in a further motion state 78c where the AGV 10 moves by rotation along a straight path. From bottom to top, the views in FIG. 11 illustrate the AGV 10 in the motion state 78c at four different and equally spaced time instants. The motion state 78c cannot be represented by an ICR.

Figure 12:
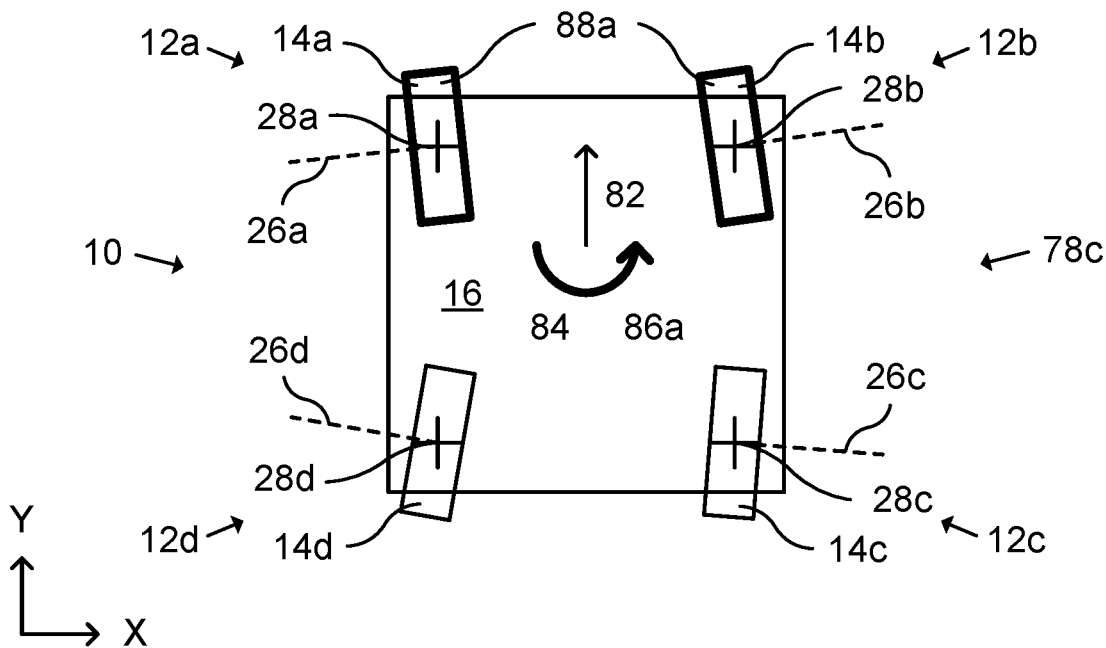
FIG. 12: schematically represents a further calculation of a first motion value of a further motion variable based on sensor data from a first pair of wheel units in the motion state in FIG. 11.

FIG. 12 schematically represents a further calculation of a first motion value 86a of a further motion variable based on sensor data from a first pair 88a of wheel units 12a and 12b in the motion state 78c in FIG. 11. The motion variable of this example is the yaw rate 84 of the body 16. In this example, none of the wheel sensors 66 and the steering sensors 44 of the first wheel unit 12a and the second wheel unit 12b is faulty. The first motion value 86a therefore gives a correct representation of the yaw rate 84.

Figure 13:
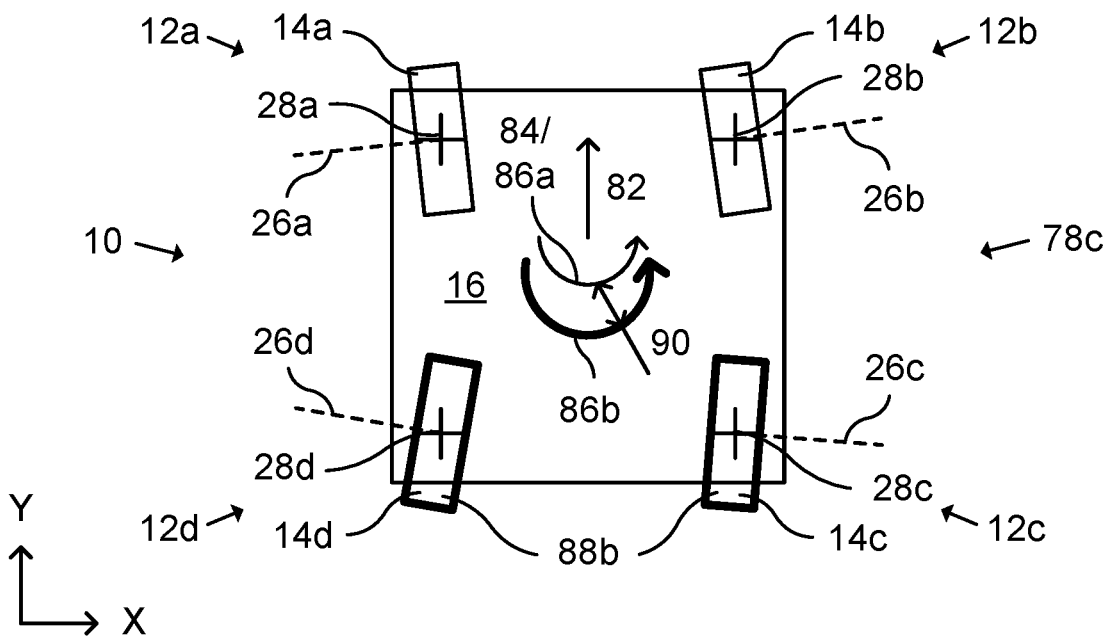
FIG. 13: schematically represents a further calculation of a second motion value of the motion variable in FIG. 12 based on sensor data from a second pair of wheel units in the motion state in FIG. 11.

FIG. 13 schematically represents a further calculation of a second motion value 86b of the yaw rate 84 based on sensor data from a second pair 88b of wheel units 12c and 12d in the motion state 78c in FIG. 11. As shown in FIG. 13, the second motion value 86b does not correctly represent the yaw rate 84 since one or more of the wheel sensors 66 and the steering sensors 44 of the third wheel unit 12c and the fourth wheel unit 12d is faulty.

A difference 90 between these motion values 86a and 86b is then calculated. In this example, the difference 90 between the motion values 86a and 86b is determined as a yaw rate difference between the first motion value 86a and the second motion value 86b. If the difference 90 exceeds a threshold value, it is determined that one of the wheel sensors 66 and the steering sensors 44 malfunctions.

Figure 14:
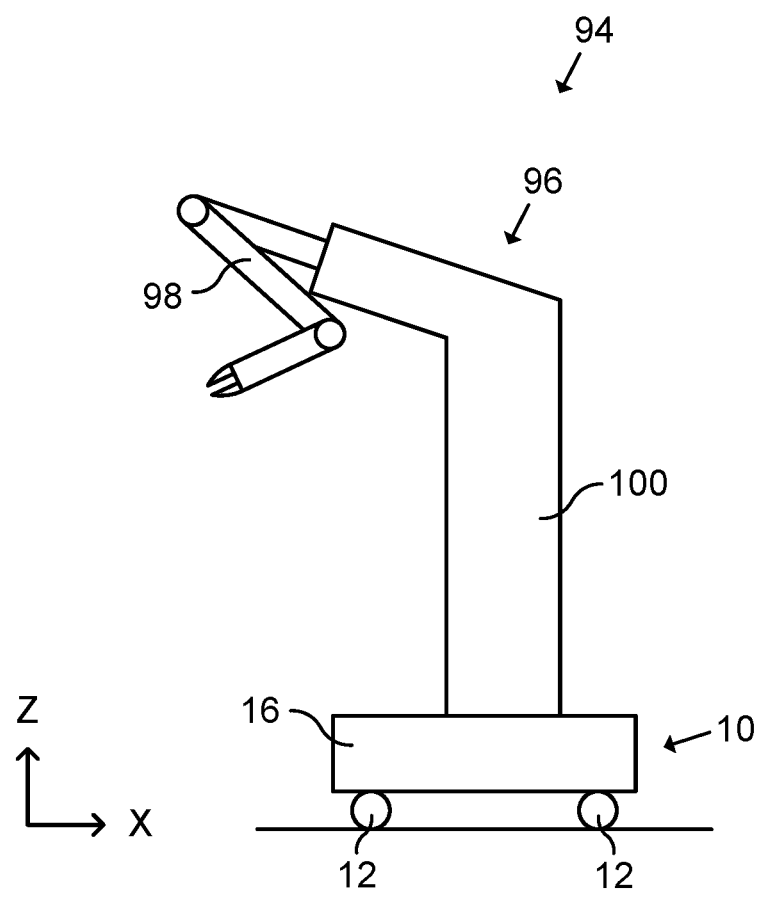
FIG. 14: schematically represents a mobile robot comprising an industrial robot carried by the AGV.

FIG. 14 schematically represents a mobile robot 94 comprising an industrial robot 96 carried by the AGV 10. The industrial robot 96 comprises at least one manipulator 98 operable in three or more axes. The manipulator 98 is arranged on a pedestal 100 standing on the body 16.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of detecting sensor malfunction in an automated guided vehicle, AGV, the AGV comprising a body and at least three independently controllable wheel units connected to the body, wherein each wheel unit comprises:
   a traction wheel rotatable about a wheel axis and about a steering axis perpendicular to the wheel axis;
   a wheel sensor arranged to determine a rotational parameter of the traction wheel with respect to the wheel axis as sensor data; and
   a steering sensor arranged to determine a rotational parameter of the traction wheel with respect to the steering axis as sensor data;
   wherein the method includes:
      for at least two different pairs of wheel units in a motion state of the AGV, calculating a motion value for at least one motion variable of the body based on the sensor data from the wheel sensors and/or the steering sensors;
      for the at least one motion variable, calculating at least one difference between the motion values for the at least two different pairs;
      determining that there is a malfunction in one or more of the wheel sensors and the steering sensors if one of the at least one difference exceeds a threshold value associated with the respective motion variable; and
      executing a countermeasure upon determining that there is a malfunction in one or more of the wheel sensors and the steering sensors.

2. The method according to claim 1, further comprising determining that there is a malfunction in one or more of the wheel sensors and the steering sensors if one of the at least one difference exceeds a threshold value associated with the respective motion variable for a predetermined time period.

3. The method according to claim 2, wherein the predetermined time period is less than 1 s.

4. The method according to claim 1, wherein the at least one motion variable comprises a velocity of the body, a yaw rate of the body and/or an instant center of rotation of the traction wheels.

5. The method according to claim 1, wherein the at least one motion variable comprises a yaw rate of the body, and at least one of a velocity of the body and an instant center of rotation of the traction wheels.

6. The method according to claim 1, wherein the sensor data comprises a rotational speed of the traction wheel about the wheel axis, a rotational position of the traction wheel about the steering axis, and/or a rotational speed of the traction wheel about the steering axis.

7. The method according to claim 1, wherein the countermeasure comprises stopping the AGV.

8. The method according to claim 1, further comprising for one or more of the at least one motion variable, determining the threshold value associated with the respective motion variable in dependence of the motion state.

9. The method according to claim 1, wherein the threshold value is determined in dependence of a resolution of one or more of the wheel sensors and the steering sensors.

10. The method according to claim 1, further comprising neglecting the malfunction if an instant center of rotation of the traction wheels is within a threshold distance from any of the steering axes.

11. The method according to claim 1, wherein the calculation of the motion value is made for each different pair of wheel units in the motion state of the AGV.

12. The method according to claim 2, wherein the at least one motion variable comprises a velocity of the body, a yaw rate of the body and/or an instant center of rotation of the traction wheels.

13. The method according to claim 2, wherein the at least one motion variable comprises a yaw rate of the body, and at least one of a velocity of the body and an instant center of rotation of the traction wheels.

14. The method according to claim 2, wherein the sensor data comprises a rotational speed of the traction wheel about the wheel axis, a rotational position of the traction wheel about the steering axis, and/or a rotational speed of the traction wheel about the steering axis.

15. A control system for detecting sensor malfunction in an automated guided vehicle, AGV, wherein the AGV comprises a body and at least three independently controllable wheel units connected to the body, and wherein each wheel unit comprises:
   a traction wheel rotatable about a wheel axis and about a steering axis perpendicular to the wheel axis;
   a wheel sensor arranged to determine a rotational parameter of the traction wheel with respect to the wheel axis as sensor data; and
   a steering sensor arranged to determine a rotational parameter of the traction wheel with respect to the steering axis as sensor data;
   wherein the control system includes at least one data processing device and at least one memory having a computer program stored thereon, the at least one computer program including a program code which, when executed by the at least one data processing device, causes the at least one data processing device to perform, and/or command performance of, method steps including:
      for at least two different pairs of wheel units in a motion state of the AGV, calculating a motion value for at least one motion variable of the body based on the sensor data from the wheel sensors and/or the steering sensors;
      for the at least one motion variable, calculating at lease one difference between the motion values for the at least two different pairs;
      determining that there is a malfunction in one or more of the wheel sensors and the steering sensors if one of the at least one difference exceeds a threshold value associated with the respective motion variable; and
      executing a countermeasure upon determining that there is a malfunction in one or more of the wheel sensors and the steering sensors.

16. The control system according to claim 15, wherein the program code, when executed by the at least one data processing device, causes the at least one data processing device to determine that there is a malfunction in one or more of the wheel sensors and the steering sensors if one of the at least one difference exceeds a threshold value associated with the respective motion variable for a predetermined time period.

17. An automated guided vehicle, AGV, the AGV comprising:
   a control system, which includes at least one data processing device and at least one memory having a computer program stored thereon, the at least one computer program including a program code which, when executed by the at least one data processing device, causes the at least one data processing device to perform, and/or command performance of, the method steps including:
  for at least tow different pairs of wheel units in a motion state of the AGV, calculating a motion value for at least one motion variable of the body based on the sensor data from the wheel sensors and/or the steering sensors;
  for the at least one motion variable, calculating at least one difference between the motion values for the at least two different pairs,
  determining that there is a malfunction in one or more of the wheel sensors and the steering sensors if one of the at least one difference exceeds a threshold value associated with the respective motion variable; and
  executing a countermeasure upon determining that there is a malfunction in one or more of the wheel sensors and the steering sensors;
a body and at least three independently controllable wheel units connected to the body, wherein each wheel unit includes:
  a traction wheel rotatable about a wheel axis and about a steering axis perpendicular to the wheel axis;
  a wheel sensor arranged to determine a rotational parameter of the traction wheel with respect to the wheel axis as sensor data; and
  a steering sensor arranged to determine a rotational parameter of the traction wheel with respect to the steering axis as sensor data.

18. The automated guided vehicle, AGV, according to claim 17, wherein the program code, when executed by the at least one data processing device, causes the at least one data processing device to determine that there is a malfunction in one or more of the wheel sensors and the steering sensors if one of the at least one difference exceeds a threshold value associated with the respective motion variable for a predetermined time period.

19. A mobile robot comprising:
  an industrial robot carried by an automated guided vehicle, AGV, wherein the AGV includes:
    a control system, which includes at least one data processing device and at least one memory having a computer program stored thereon, the at least one computer program including a program code which, when executed by the at least one data processing device, causes the at least one data processing device to perform, and/or command performance of, method steps including:
      for at least two different pairs of wheel units in a motion state of the AGV, calculating a motion value for at least one motion variable of the body based on the sensor data from the wheel sensors and/or the steering sensors;
      for the at least one motion variable, calculating at least one difference between the motion values for the at least two different pairs;
      determining that there is a malfunction in one or more of the wheel sensors and the steering sensors if one of the at least one difference exceeds a threshold value associated with the respective motion variable; and
      executing a countermeasure upon determining that there is a malfunction in one or more of the wheel sensors and the steering sensors;
    a body and at least three independently controllable wheel units connected to the body, wherein each wheel unit includes:
      a traction wheel rotatable about a wheel axis and about a steering axis perpendicular to the wheel axis,
      a wheel sensor arranged to determine a rotational parameter of the traction wheel with respect to the wheel axis as sensor data; and
      a steering sensor arranged to determine a rotational parameter of the traction wheel with respect to the steering axis as sensor data.

20. The mobile robot according to claim 19, wherein the program code, when executed by the at least one data processing device, causes the at least one data processing device to determine that there is a malfunction in one or more of the wheel sensors and the steering sensors if one of the at least one difference exceeds a threshold value associated with the respective motion variable for a predetermined time period.

* * * * *